United States Patent [19]

Pindell

[11] 4,227,659

[45] Oct. 14, 1980

[54] FISHING LINE STORAGE REEL

[76] Inventor: Roy K. Pindell, 3158 Boone, Memphis, Tenn. 38127

[21] Appl. No.: 5,203

[22] Filed: Jan. 22, 1979

[51] Int. Cl.³ .................... A01K 89/015; A01K 89/02
[52] U.S. Cl. .................................. 242/84.1 R; 43/20
[58] Field of Search ............. 242/84.1 R, 84.1 L, 242/106, 141, 99, 96, 84.5 R; 43/20, 25

[56] References Cited

U.S. PATENT DOCUMENTS

| | | | |
|---|---|---|---|
| 2,261,629 | 11/1941 | Murphy | 242/84.1 L |
| 2,393,911 | 1/1946 | Karle | 242/96 |
| 2,965,329 | 12/1960 | Summers | 43/20 X |
| 2,993,661 | 7/1961 | D'Arrigo | 43/20 X |
| 3,652,027 | 3/1972 | Wong | 242/99 |

Primary Examiner—Billy S. Taylor

[57] ABSTRACT

A fishing line storage reel for allowing fishing line to be selectively played out and reeled in. A stator having a cylindrical body portion is fixedly attached to the butt end of a fishing pole. A rotor is rotatably and slidably mounted on the body portion of the stator. A quantity of fishing line is wrapped around the rotor. A lug protrudes outwardly from the body portion of the stator and coacts with a slot in the rotor to prevent the rotor from rotating when the rotor is in a first position and to allow the rotor to rotate when it is slid to a second position. A retainer is provided to selectively hold the rotor in the first position.

6 Claims, 7 Drawing Figures

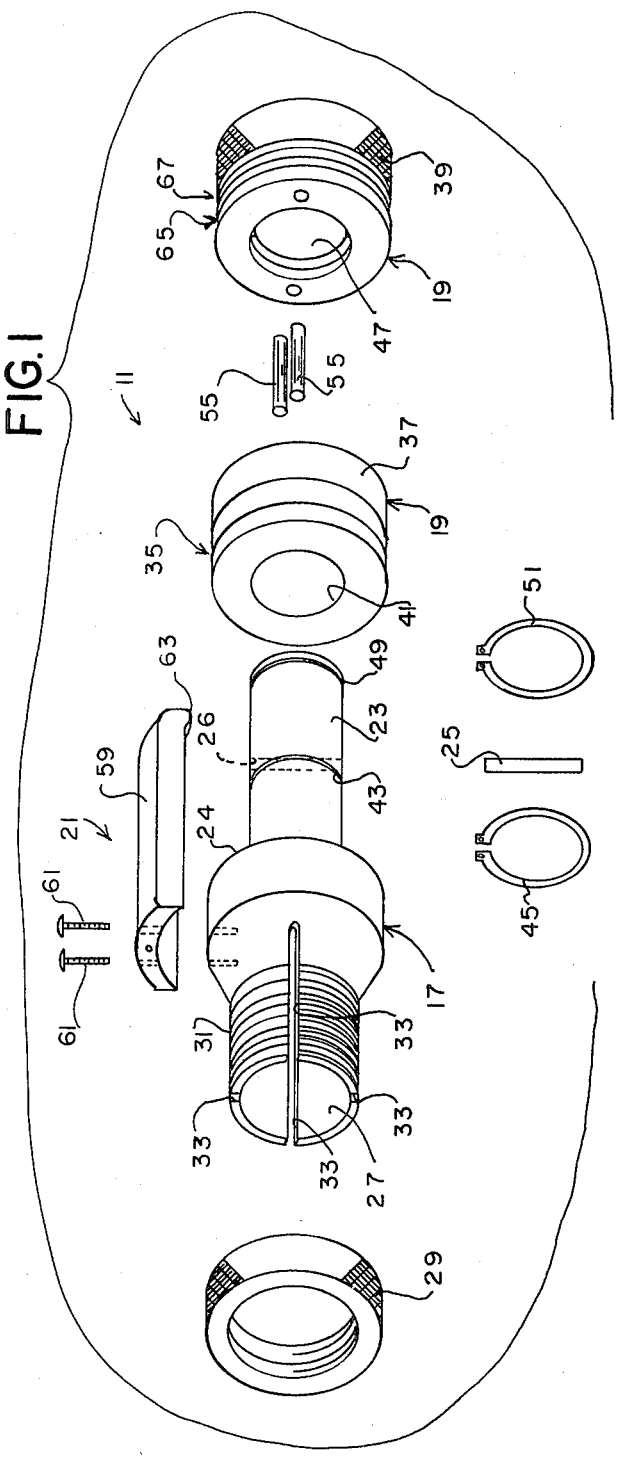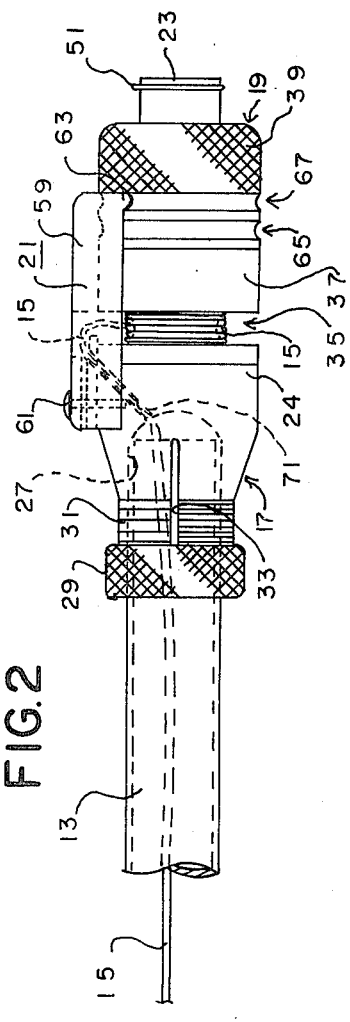

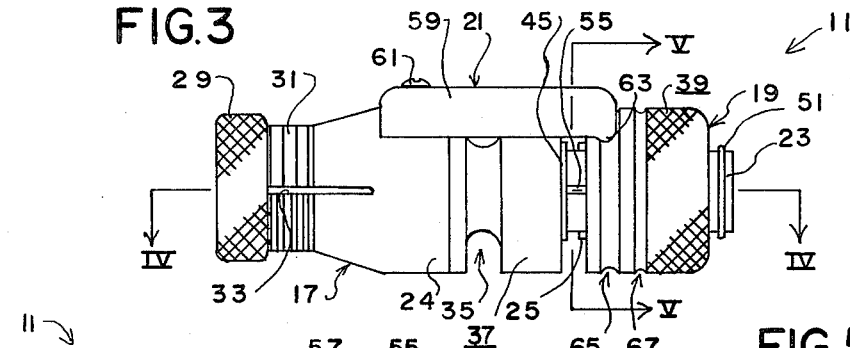
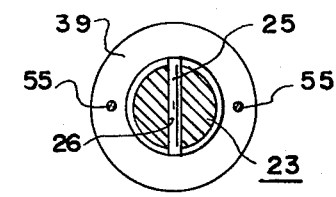
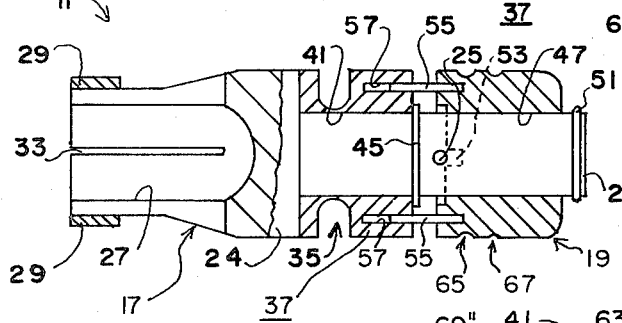
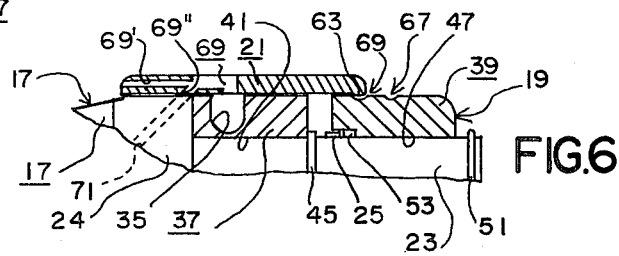
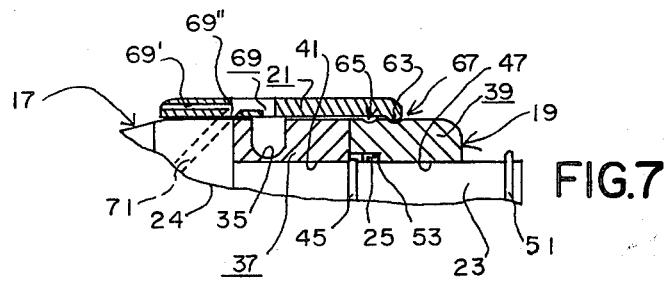

FISHING LINE STORAGE REEL

BACKGROUND OF THE INVENTION

1. Field of the Invention

This invention relates to fishing line storage reel for attachment to fishing poles to allow fishing lines to be selectively played out and reeled in.

2. Description of the Prior Art

Various fishing reels having heretofore been developed. See, for example, Kovalchik, U.S. Pat. Nos. 2,720,365 and Nagy, U.S. Pat. No. 3,351,300. Neither of the above patents disclose or suggest the present invention.

Perhaps the most popular form of fishing in United States is "cane pole" fishing where a cane or fiberglass pole or the like of around 10' to 14' in length and having a substantially constant length of fishing line depending from the tip end thereof is utilized. Under various conditions, it is desirable to vary the substantially constant length of fishing line depending from the tip end of the fishing pole. Various ways of accomplishing this have heretofore been practiced such as wrapping a length of line around the tip end of the pole to shorten the amount of line extending therefrom and to allow line to be unwrapped therefrom when a greater length of line depending from the tip end of the pole is desire, attaching substantially complex casting or spinning reels to the butt end of the pole, etc.

SUMMARY OF THE INVENTION

This invention is directed towards providing a fishing line storage reel for attachment to the end of a fishing pole which is composed of a minimum amount of moving parts and which allows fishing line to be selectively played out and reeled in to vary the amount of line depending from the tip end of the fishing pole. The concept of the present invention is to provide a fishing line storage reel which includes, in general, a stator means for being fixedly attached to the fishing pole, the stator means including a substantially cylindrical body portion and including a lug member fixedly attached to and protruding from the body portion; a rotor means for being rotatably and slidably mounted on the body portion of the stator means, the rotor means having a cavity therein for selective engagement with the lug member of the stator means, the rotor means being slidable on the body portion of the stator means between a first position in which the lug member is positioned within the cavity to prevent rotation of the rotor means and a second position in which the lug member is not positioned within the cavity to allow rotation of the rotor means, the rotor means having a peripheral groove thereabout for containing a quantity of fishing line; and a retainer means for selectively holding the rotor means in the first position.

BRIEF DESCRIPTION OF THE DRAWINGS

FIG. 1 is an exploded pictorial view of the storage reel of the present invention.

FIG. 2 is a side elevational view of the storage reel of the present invention shown associated with a fishing pole and a length of fishing line.

FIG. 3 is a side elevational view of the storage reel of the present invention.

FIG. 4 is a sectional view as taken on line IV—IV of FIG. 3.

FIG. 5 is a sectional view as taken on line V—V of FIG. 3 with some parts removed for clarity.

FIG. 6 is a sectional view of a portion of the storage reel of the present invention.

FIG. 7 is a sectional view similar to FIG. 6 but showing the rotor means in a moved position.

DESCRIPTION OF THE PREFERRED EMBODIMENT

The storage reel 11 of the present invention is for use with a fishing pole 13 to store a quantity of fishing line 15 and to allow the fishing line 15 to be selectively played out and reeled in to vary the length of fishing line depending from the tip end of the pole 13. The pole 13 may be of any type known to those skilled in the art. That is, the pole 13 may be a typical cane pole, a well known telescoping fiberglass pole, or the like. The line 15 may also be of any type known to those skilled in the art. The pole 13 may be hollow and the line 15 may pass axially therethrough. The reel 11 includes, in general, a stator means 17, a rotor means 19, and a retainer means 21.

The stator means 17 is for being fixedly attached to the butt end of the fishing pole 13. The stator means 17 includes a substantially cylindrical body portion 23 and includes a lug member fixedly attached to and protruding from the body portion 23. The body portion 23 is preferably provided with a collar portion 24 as clearly shown in the drawings to act as a stop for the rotor means 19 in a manner which will hereafter become apparent. The lug member may consist of a pin 25 extending an aperture 26 which extends transversely through the body portion 23 and protruding outwardly of the body portion 23 on one or both ends to thereby define at least one lug member. The stator means 17 may have a cavity 27 therein for receiving a portion of the fishing pole 13. The reel 11 may include a compression nut 29 for fixedly attaching the stator means 17 to the fishing pole 13. That is, the stator means 17 may include a threaded portion 31 adjacent the cavity 27 and may include a plurality of slots 33 adjacent the cavity 27 whereby the compression nut 29 can be utilized in a manner which should be apparent to those skilled in the art to compress a portion of the stator means 17 whereby the cavity 27 is reduced in size to thereby frictionally hold the pole 13 therein.

The rotor means 19 is for being rotatably and slidably mounted on the body portion 23 of the stator means 17. The rotor means 19 has a cavity therein for selective engagement with the outer ends of the pin 25 and is slidable on the body portion 23 between a first portion in which the outer ends of the pin 23 are positioned within the cavity of the rotor means 19 to prevent rotation of the rotor means 19 on the body portion 23 and a second position in which the out ends of the pin 25 are not positioned within the cavity of the rotor means 19 to allow rotation of the rotor means 19 on the body portion. The rotor means 19 preferably has a peripheral groove 35 thereabout for containing a quantity of fishing line 15. The rotor means 19 preferably includes a spool member 37 rotatably mounted on the body portion 23 and a rotor means 39 slidably and rotatably mounted on the body portion 23. The groove 35 is in the spool member 37 as clearly shown in the drawings. The spool member 37 preferably has a central aperture 41 therethrough for allowing the spool member 37 to be rotatably mounted on the body portion 23 between the pin 25 and the collar portion 24. The body portion 23 may include a groove 43 thereabout for allowing a well known spring type retaining ring 45 to be attached thereto to attach the spool member 37 to the body portion 23 between the pin 25 and the collar portion 24 and prevent any substantial sliding movement thereof. The rotor member 39 preferably has an aperture 47 extending through the center thereof for allowing the rotor member 39 to be rotatably and slidably mounted on the body portion 23. The body portion 23 may have a groove 49 therein adjacent the end thereof for allowing a spring type retaining ring 51 to be attached thereto to prevent the rotor member 39 from sliding off the end of the body portion 23. The cavity for selective engagement with the lug member of the stator means is preferably in the rotor member 39. More specifically, the rotor member 39 preferalby has a pair of slot-like cavities 53 contiguous with the aperture 47 for selectively receiving the outer portions of the pin 25. The rotor member 39 preferably includes one or more pin members 55 protruding therefrom and extending into apertures 55 in the spool member 37 to thereby cause the spool member 37 to rotate when the rotor member 39 is rotated and for preventing rotation of the spool member 37 when the rotor means 19 is in the first position with the outer portions of the pin 25 located in the slot-like cavaties 53.

The retainer means may include a body member 59 for being fixedly attached to the stator means 17 by way of screws 61 or the like. The body member 59 preferably includes a heel portion 63. The rotor member 39 preferably includes a pair of peripheral grooves 65, 67 for coacting with the heel portion 63 to cause the rotor member 39 to be selectively retained in the first or second position. More specifically, the heel portion 63 engages the periphery groove 63 when the rotor means 19 is in the first position to selectively hold the rotor means 19 in the first position and engages the periphery groove 67 when the rotor means 19 is in the second position to selectively hold the rotor means 19 in the second position. At least the heel portion 63 of the body member 59 is preferably of a substantially resilient material to allow the rotor member 39 to be manually moved between the first and second positions. The body member 59 preferably has an aperture 69 therethrough for guiding the fishing line 15 therethrough from the peripheral groove 35 to the fishing pole 13. The outer end of the aperture 69 may branch into a first portion 69' and a second portion 69''. The first portion 69' may be utilized to guide the fishing line 15 to the outside of the fishing pole 13. The second portion 69'' of the aperture 69 may be utilized to guide the fishing line 15 into the interior of the fishing pole 13. The stator means 17 may include an aperture 71 for coacting with the second portion 69'' of the aperture 69 as clearly shown in FIG. 2.

The reel 11 may be constructed entirely of one material or a combination of several materials such as aluminum, magnesium, plastic, wood and the like.

The operation of the reel 11 of the present invention is quite simple. The stator means 17 is first attached to the butt end of the fishing pole 13 and a quantity of line 15 is attached to the spool member 37 and guided through the aperture 69 to the tip end of the pole 13. Then to vary the amount of line 15 depending from the tip end of the pole 13, the rotor member 39 is merely moved to the second position and rotated thereby causing the spool member 37 to rotate whereby the line 15 is either played out or reeled in. Once a proper amount of line 15 is played out or reeled in, the rotor member 39 is then moved to the first position thereby preventing further rotation of the spool member 37.

Although the present invention has been described and illustrated with respect to a preferred embodiment it is not to be so limited since changes and modifications may be made therein which are within the full intended scope of the invention.

I claim:

1. A storage reel for attachment to a fishing pole to store a quanity of fishing line and to allow the fishing line to be selectively played out and reeled in, said storage reel comprising:
   (a) a stator member for being fixedly attached to the butt end of the fishing pole, said stator member including a cylindrical body portion;
   (b) a lug member attached to and protruding outwardly from said body portion of said stator member;
   (c) rotor means for holding a quanity of fishing line and for being rotatably and slidably mounted on said body portion of said stator member, said rotor means having a slot therein for selectively receiving said lug member, said rotor means being slidable between a first position with said lub member received within said slot to prevent rotation of said rotor means and a second position with said lug member not received in said slot to allow rotation of said rotor means, said rotor means including a pair of peripheral grooves thereabout; and
   (d) retainer means for selectively holding said rotor means in said first position, said retainer means including a body member for being attached to said stator member, said body member of said retainer means including a heel portion for engaging one of said pair of peripheral grooves of said rotor means when said rotor means is in said first position to selectively hold said rotor means in said first position and for engaging the other of said pair of peripheral grooves of said rotor means when said rotor means is in said second position to selectively hold said rotor means in said second position.

2. The storage reel of claim 1 in which said body member of said retainer means has an aperture therethrough for guiding fishing line fronm said rotor means to the fishing pole.

3. The storage reel of claim 2 in which said rotor means includes a spool member rotatably mounted on said body portion of said stator member and includes a rotor member rotatably and slidably mounted on said body portion of said stator means, said rotor member including a pin portion extending therefrom, said spool member having a pin-receiving cavity for receiving said pin portion of said rotor member for preventing rotation of said spool member when said rotor means is in first position.

4. The storage reel of claim 3 in which said stator member has a cavity therein for receiving a portion of the fishing pole, and in which is included a compression nut means for fixedly attaching said stator member to the fishing pole.

5. A storage reel for attachment to a fishing pole to store a quanity of fishing line and to allow the fishing line to be selectively played out and reeled in, said storage reel comprising:
   (a) a stator member having a cavity therein for fixedly receiving the butt end of the fishing pole and including a cylindrical body portion;

(b) a pin member extending transversely through said body portion of said stator member, said pin member being greater in length than the cross-sectional diameter of said body portion of said stator member, each end of said pin member protruding from said body portion to define a pair of opposed lug portions;

(c) a spool member for holding a quantity of fishing line, said spool member having an aperture therethrough for allowing said body portion of said stator member to extend therethrough and to rotatably mount said spool member on said stator member;

(d) a rotor member having an aperture therethrough for allowing said body portion of said stator member to extend therethrough and to rotatably and slidably mount said rotor member on said stator member, said rotor member having a transverse slot in one end thereof for selectively receiving said lug portions, said rotor member being slidably between a first position with said lug portions received within said slot to prevent rotation of said rotor member and a second position with said lug portions not received in said slot to allow rotation of said rotor member;

(e) a pair of pin members extending between said spool member and said rotor member to prevent said spool member from rotating when said rotor member is in said first position; and (f) retainer means for selectively holding said rotor member in said first position, said retainer means having an aperture therethrough for guiding fishing line from said spool member to the fishing pole.

6. The storage reel of claim 4 in which said rotor member includes a pair of peripheral grooves thereabout, and in which said retainer means includes a body member for being attached to said stator member, said body member of said retainer means including a heel portion for engaging one of said pair of peripheral grooves of said rotor member when said rotor member is in said first position to selectively hold said rotor member in said first position and for engaging the other of said pair of peripheral grooves of said rotor member when said rotor member is in said second position to selectively hold said rotor member in said second position.

* * * * *